(12) United States Patent
Bermudez (10) Patent No.: US 10,366,604 B1
(45) Date of Patent: Jul. 30, 2019

(54) TAXI INFORMATION SYSTEM

(71) Applicant: Robert Joseph Bermudez, Las Vegas, NV (US)

(72) Inventor: Robert Joseph Bermudez, Las Vegas, NV (US)

( * ) Notice: Subject to any disclaimer, the term of this patent is extended or adjusted under 35 U.S.C. 154(b) by 698 days.

(21) Appl. No.: 14/954,238

(22) Filed: Nov. 30, 2015

Related U.S. Application Data (60) Provisional application No. 62/091,468, filed on Dec. 12, 2014.

(51) Int. Cl.
| | |
|---|---|
| *G01C 21/36* | (2006.01) |
| *G01C 21/34* | (2006.01) |
| *G08G 1/01* | (2006.01) |
| *G01S 19/42* | (2010.01) |

(52) U.S. Cl.
CPC ....... *G08G 1/0137* (2013.01); *G01C 21/3667* (2013.01); *G01C 21/3697* (2013.01); *G01S 19/42* (2013.01); *G08G 1/0125* (2013.01)

(58) Field of Classification Search
None
See application file for complete search history.

(56) References Cited

U.S. PATENT DOCUMENTS

| | | | |
|---|---|---|---|
| 6,756,913 | B1 | 6/2004 | Ayed |
| 8,554,457 | B2 | 10/2013 | White et al. |
| 8,554,608 | B1 | 10/2013 | O'Connor |
| 8,799,038 | B2 | 8/2014 | Chen et al. |
| 8,860,587 | B2 | 10/2014 | Nordstrom |
| 9,519,921 | B2 * | 12/2016 | Wei ..................... G06Q 10/02 |
| 2003/0190058 | A1 | 10/2003 | Jun et al. |
| 2005/0227704 | A1 | 10/2005 | Ferra et al. |
| 2009/0326991 | A1 | 12/2009 | Wei et al. |

(Continued)

FOREIGN PATENT DOCUMENTS

| | | | | |
|---|---|---|---|---|
| CN | 103366558 | A | * 10/2013 | ............... C08G 1/00 |
| JP | 2003162566 | A2 | 6/2003 | |

OTHER PUBLICATIONS

CN103366558A Google translation (Year: 2013).*

(Continued)

*Primary Examiner* — Hussein Elchanti
*Assistant Examiner* — Paul A Castro
(74) *Attorney, Agent, or Firm* — Quickpatents, LLC; Kevin Prince (57) ABSTRACT

A system for displaying information to drivers of taxis in an operating region that has a plurality of popular destinations includes a display device fixed within each taxi. The display device includes a plurality of selectable information screens that are each adapted to display information received by a transceiver of the display device. A dispatch information system is adapted to transmit dispatching data of the operating region to the display devices of each taxi. A queue information device associated with each of the popular destinations is adapted to transmit queue information to the dispatching information system. Preferably at least one of the selectable information screens includes a map of the operating region, which may be separated into different grids each having a queue length aggregate indicator that indicates the average load time of all of the taxi queues of the popular destinations within that grid.

19 Claims, 6 Drawing Sheets

(56) References Cited

U.S. PATENT DOCUMENTS

| | | |
|---|---|---|
| 2011/0099040 A1 | 4/2011 | Felt et al. |
| 2011/0225269 A1 | 9/2011 | Yap et al. |
| 2012/0203600 A1 | 8/2012 | Fiorucci et al. |
| 2013/0013381 A1 | 1/2013 | Liu |
| 2013/0024249 A1 | 1/2013 | Zohar et al. |
| 2013/0041573 A1* | 2/2013 | Ochi ............... G01S 13/345 |
| | | 701/117 |
| 2013/0304347 A1 | 11/2013 | Davidson |
| 2014/0108080 A1* | 4/2014 | Mitchell ............ G06F 17/00 |
| | | 705/7.15 |

OTHER PUBLICATIONS

Cheng et al, "A Service Choice Model for Optimizing Taxi Service Delivery", Proceedings of the 12th International IEEE Conference on Intelligent Transporation Systems, Oct. 3, 2009 (Oct. 3, 2009), entire document.

* cited by examiner

TAXI INFORMATION SYSTEM

CROSS-REFERENCE TO RELATED APPLICATIONS

This application claims the benefit of U.S. Provisional Patent Application 62/091,468, filed on Dec. 12, 2014, and incorporated herein by reference.

STATEMENT REGARDING FEDERALLY SPONSORED RESEARCH AND DEVELOPMENT

Not Applicable.

FIELD OF THE INVENTION

This invention relates to taxi dispatching systems, and more particularly to a taxi information system for increasing the efficiency of taxi operations.

DISCUSSION OF RELATED ART

In areas served by numerous taxi companies and having many popular destinations, taxi drivers often have no idea how busy particular destinations are in terms of taxi demand and taxi supply. For those destinations having taxi queues and taxi stands, a taxi driver choosing to wait in the taxi queue may inadvertently have chosen a taxi queue that is relatively long and that has little demand, when a neighboring taxi queue may be much shorter and would result in a quicker fare and less idling in a slow-moving taxi queue.

Further, after having dropped off a rider in an area outside of the main popular destinations, if another ride request isn't nearby typically a taxi driver will select a general area to drive to in order to pick-up a new fare, but it is unknown as to which areas are currently the busiest and have the shortest wait times on average.

In the case where a nearby ride request has been made, many dispatching system currently use a radio system with a dispatcher who indicates where to pick-up the rider. For taxi drivers unfamiliar with the location as provided verbally by the dispatcher, it is difficult to quickly calculate how far that rider may be from his current location without extensive knowledge of the streets in the particular area.

Therefore, there is a need for a system that increases the efficiency of taxi operations by indicating on a display screen those general areas of an operating region that are underserved by taxis at a particular time. Such a needed system would show average load times for taxis in various sectors or grids of the overall operating region, and further the average taxi load times and queue lengths at specific popular destinations. Such a needed system would further allow for ride requests to be displayed on a map that also displays the taxi's current location, allowing taxi drivers to quickly determine how close they are to a ride request location, even if such a ride request has originated with a different taxi company. The present invention accomplishes these objectives.

SUMMARY OF THE INVENTION

The present invention is a system for displaying information to drivers of taxis in an operating region that has a plurality of popular destinations. A display device is fixed within each taxi. The display device includes a plurality of selectable information screens that are each adapted to display information received by a transceiver of the display device. The display device may be a tablet computer, a smart phone, a GPS-type device, or a dedicated display device. Such a display device further includes a power source, processor, non-volatile memory, and the like.

A dispatch information system is adapted to transmit dispatching data of the operating region to the display devices of each taxi. Such dispatching data may be that information received from the display devices of the taxis, ride requests received from taxi company call centers through a call center input, such as the Internet or other wired or wireless network, phone network, or the like, as well as other information described below.

A queue information device associated with each of the popular destinations is adapted to transmit queue information to the dispatching information system. Such a queue information device may be a tablet computer, a smart phone, a laptop, or a dedicated queue information device that includes a display and a user interface. The queue information includes at least an estimated length of the taxi queue at the popular destination, as either entered manually on an interface of the queue information device by a taxi stand doorman at each of the popular destinations, or as measured periodically by at least one sensor at the taxi queue, such as a camera, magnetic sensors embedded in a roadway, optical sensors fixed adjacent to a roadway, or the like. The dispatching data transmitted to each display device by the dispatch information system includes at least the length of the taxi queue at each popular destination and the average load time for each taxi as calculated by the change in the length of the taxi queue over time.

Preferably at least one of the selectable information screens of each display device includes a map of the operating region or portions thereof. In one embodiment, the operating region is separated into different grids each having a queue length aggregate indicator that indicates the average load time of all of the taxi queues of the popular destinations within that grid.

In a preferred embodiment, each display device further includes a GPS navigation system that is adapted to determine a current location of the taxi and display the current location on the map. The GPS navigation system may further be adapted to superimpose traffic information received by the display device onto the map, and to provide routing information between the current location of the taxi and an entered or indicated destination.

In one embodiment, the dispatch information system further includes a call center input wherein a ride request received by a call center may be transmitted to the display devices of each taxi. The display device in each taxi further is adapted to display the location of the ride request on the map and to further display a status of the ride request, such as "available," "accepted," "expired," or the like.

In such an embodiment, each display device may further include a user interface that allows the driver to accept the ride request, after which the transceiver of the display device informs the dispatch information system of the acceptance of the ride request by the taxi and transmits the status of the ride request as being "accepted" to the display devices of the other taxis within the region. In one embodiment wherein the display devices each include the GPS navigation system, only those ride requests within a predetermined distance, such as one mile for example, of the current location of the taxi are displayed on display device, and the driver is prevented from accepting ride requests outside of the predetermined distance of his current location.

Preferably one of the selectable information screens includes a bar graph showing the length of the taxi queue at each of the popular destinations, and also preferably the average load times for each of the popular destinations. Further, taxi queue affecting event information may also be displayed on such an information screen, as entered by the taxi stand doorman, for example.

Preferably the popular destinations include airport pickup locations within the airport. Airports are such important travel destinations that airport information may be displayed on multiple of the information screens, such airport information including any of average taxi loading times, open taxi queue lanes, taxi queue length, number of flights landing within a next predetermined period of time, expected number of passengers landing within a next predetermined period of time, or the like.

The present system increases the efficiency of taxi operations by indicating on a display screen those general areas of an operating region that are underserved by taxis at a particular time. The present invention shows average load times for taxis in various sectors or grids of the overall operating region, and further the average taxi load times and queue lengths at specific popular destinations such as airports and resorts. The present system further allows for ride requests to be displayed on a map that also displays the taxi's current location, allowing taxi drivers to quickly determine how close they are to a ride request location, even if such a ride request has originated with a different taxi company. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
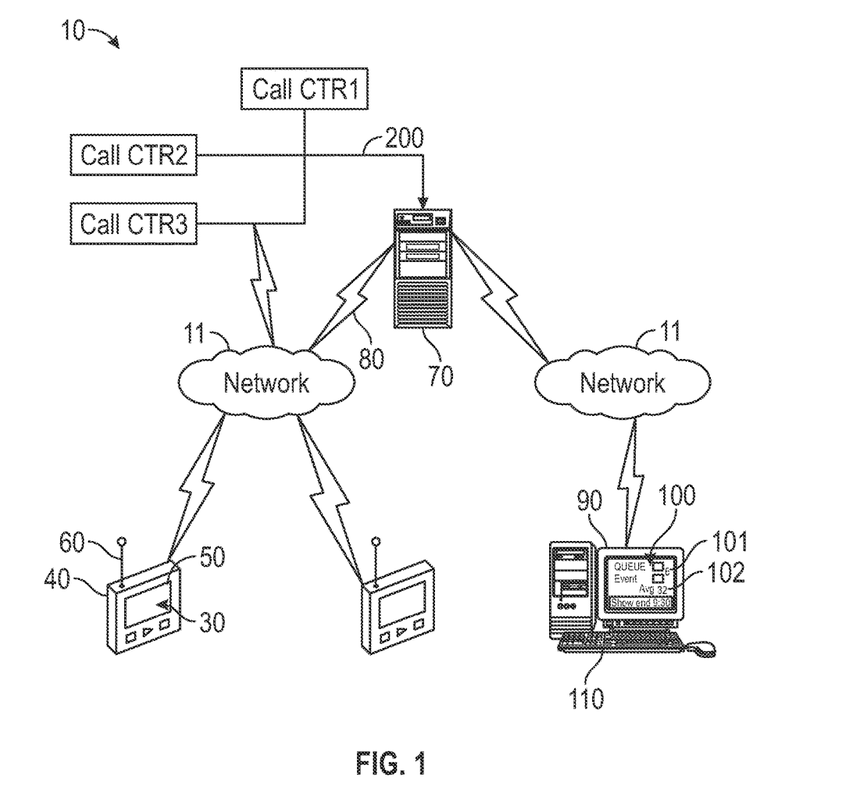
FIG. 1 is a diagram of the system of the invention.
Figure 2:
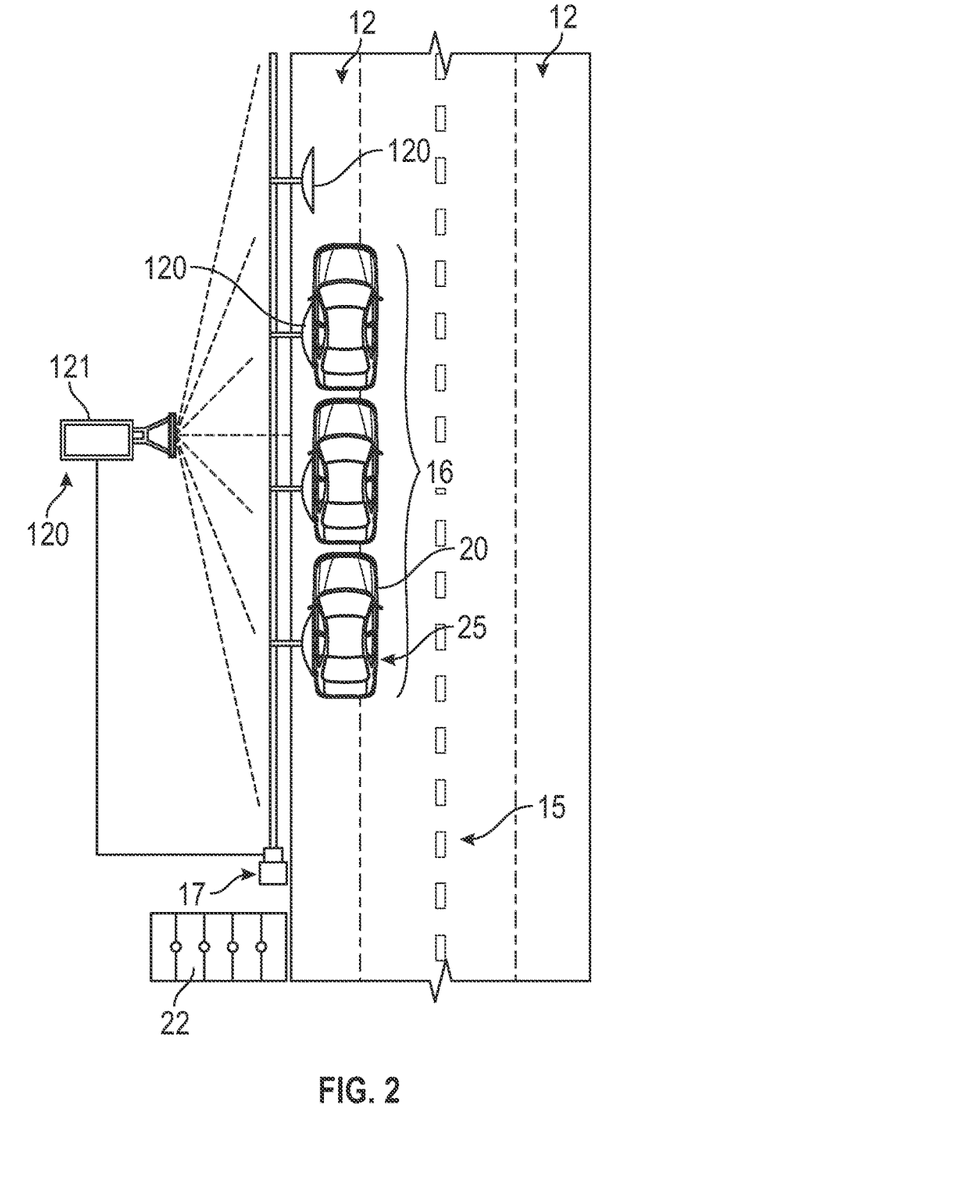
FIG. 2 is a diagram of a taxi queue at a popular destination within an operating area of the system.

FIGS. 1-2 illustrate a system 10 for displaying information 30 to drivers 25 of taxis 20 in an operating region 18 that has a plurality of popular destinations 15. For example, the operating region 18 may be Las Vegas, Nev., and the popular destinations 15 may include various resorts such as Mandalay Bay, golf clubs, airports, and the like.

Figure 3:
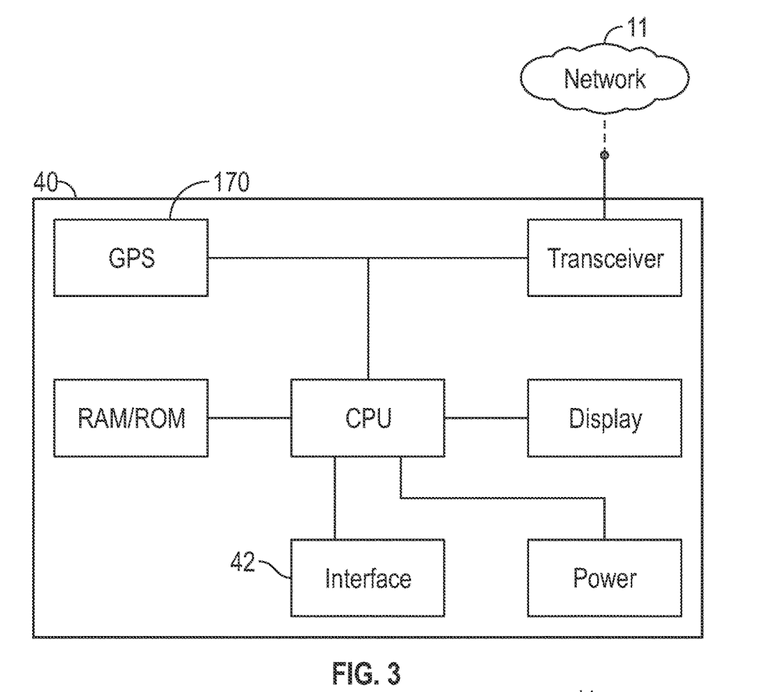
FIG. 3 is a diagram of a display device of the invention.
Figure 4:
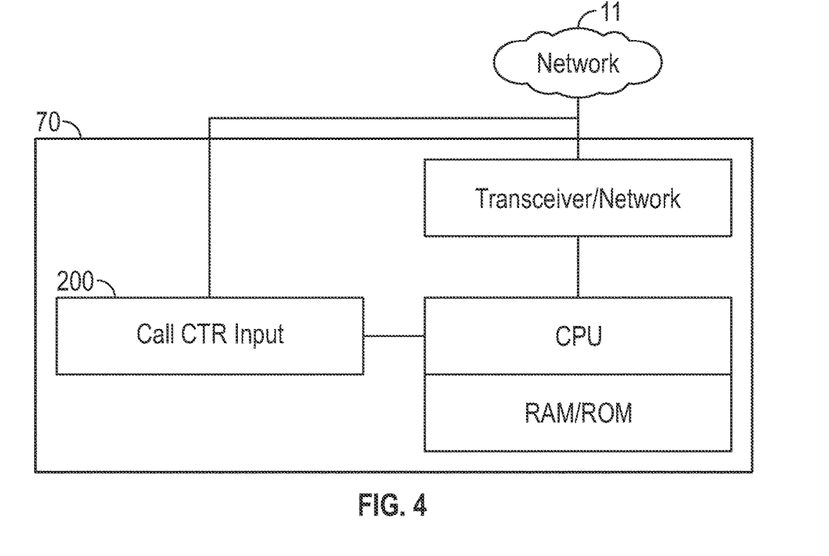
FIG. 4 is a diagram of a dispatch information system of the system.

A display device 40 (FIGS. 1 and 3) is fixed within each taxi 20. The display device 40 includes a plurality of selectable information screens 50 (FIGS. 3-5) that are each adapted to display information 30 received by a transceiver 60 of the display device 40. The display device 40 may be a tablet computer (not shown), a smart phone (not shown), a GPS-type device (not shown), or a dedicated display device 40. Such a display device 40 further includes a power source, processor, non-volatile memory, and the like (FIG. 3).

A dispatch information system 70 (FIG. 4) is adapted to transmit dispatching data 80 of the operating region 18 to the display devices 40 of each taxi 20. Such dispatching data 80 may be that information received from the display devices 40 of the taxis 20, ride requests received from taxi company call centers through a call center input 200, such as the Internet or other wired or wireless network, phone network, or the like, as well as other information described below.

A queue information device 90 associated with each of the popular destinations 50 is adapted to transmit queue information 100 to the dispatching information system 70. Such a queue information device 90 may be a tablet computer (not shown), a smart phone (not shown), a laptop (not shown), or a dedicated queue information device 90 comprising a display and a user interface 42 (FIG. 1). The queue information 100 includes at least an estimated length 101 of the taxi queue 16 at the popular destination 15, as either entered manually on an interface 110 of the queue information device 90 by a taxi stand doorman 17 at each of the popular destinations 15, or as measured periodically by at least one sensor 120 at the taxi queue 16, such as a camera 121, magnetic sensors 120 embedded in a roadway, optical sensors (not shown) fixed adjacent to a roadway, or the like. The queue information device 90 may also receive or detect an estimated number of people waiting for a taxi 20 in a rider queue 22 (FIG. 2).

The dispatching data 80 transmitted to each display device 40 by the dispatch information system 70 includes at least the length of the taxi queue 16 at each popular destination 15 and the average load time 102 for each taxi 20 as calculated by the change in the length 101 of the taxi queue 16 over time.

Figure 5:
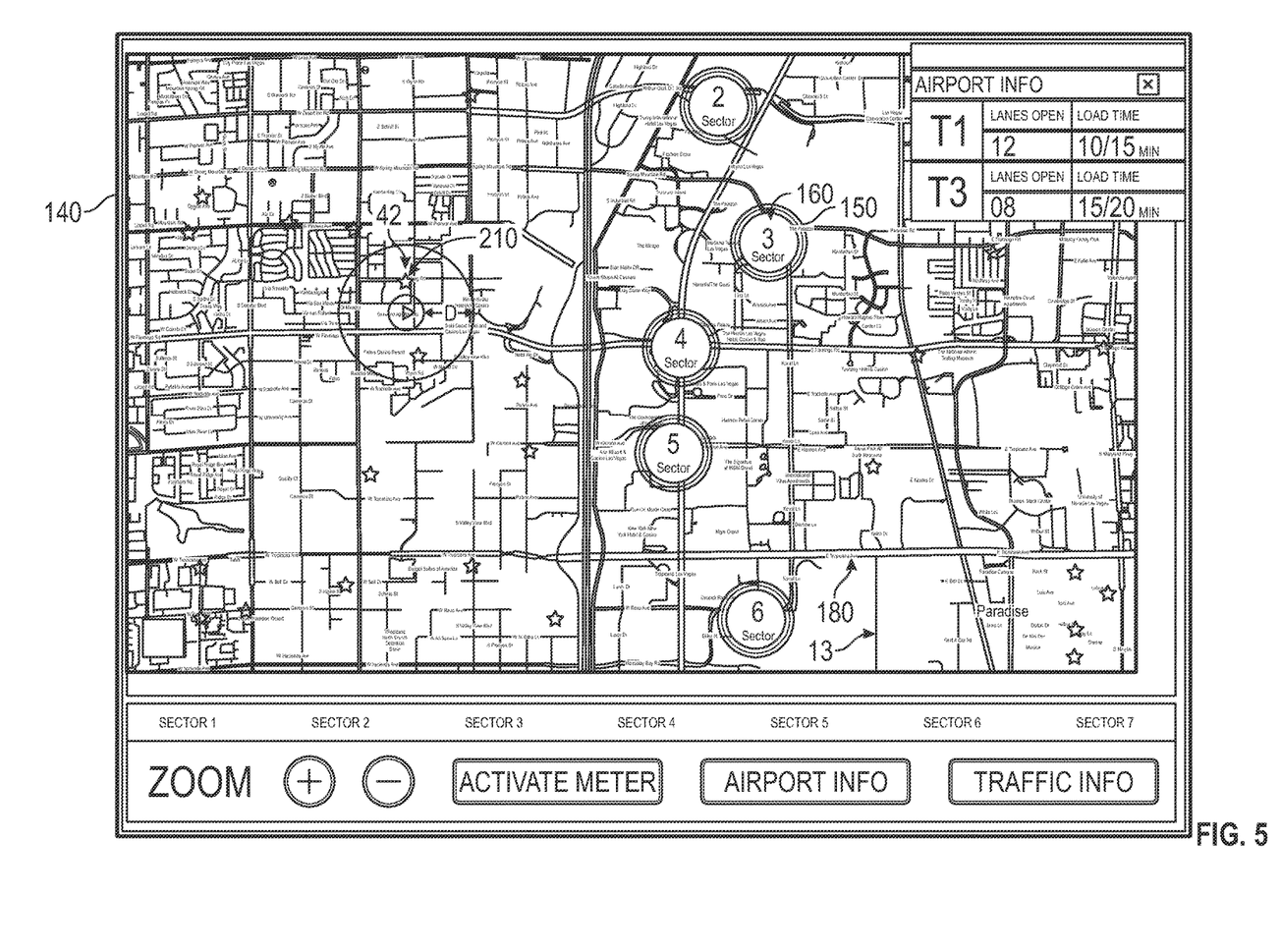
FIG. 5 is a display screen of the display device showing a map of the operating area.

Preferably at least one of the selectable information screens 50 of each display device 40 includes a map 140 of the operating region 18 or portions thereof (FIG. 5). In one embodiment, the operating region 18 is separated into different grids 150 each having a queue length aggregate indicator 160 that indicates the average load time 102 of all of the taxi queues 16 of the popular destinations 15 within that grid 150. Such a queue length aggregate indicator 160 may be color coded, such that those grids 150 having a lower average load time 102 are displayed in a first color, such as green, while those grids 150 having a higher average load time 102 are displayed in a second color, such as red. As such, the taxi drivers 25 may quickly ascertain which grids 150 of the operating region 18 have the highest demand for taxis 20 and the lowest average loading times 102. Likewise, or additionally, the queue length aggregate indicator 160 may be numerically coded to display the average loading times 102 of all of the popular destinations 15 within each grid 150.

Figure 7:
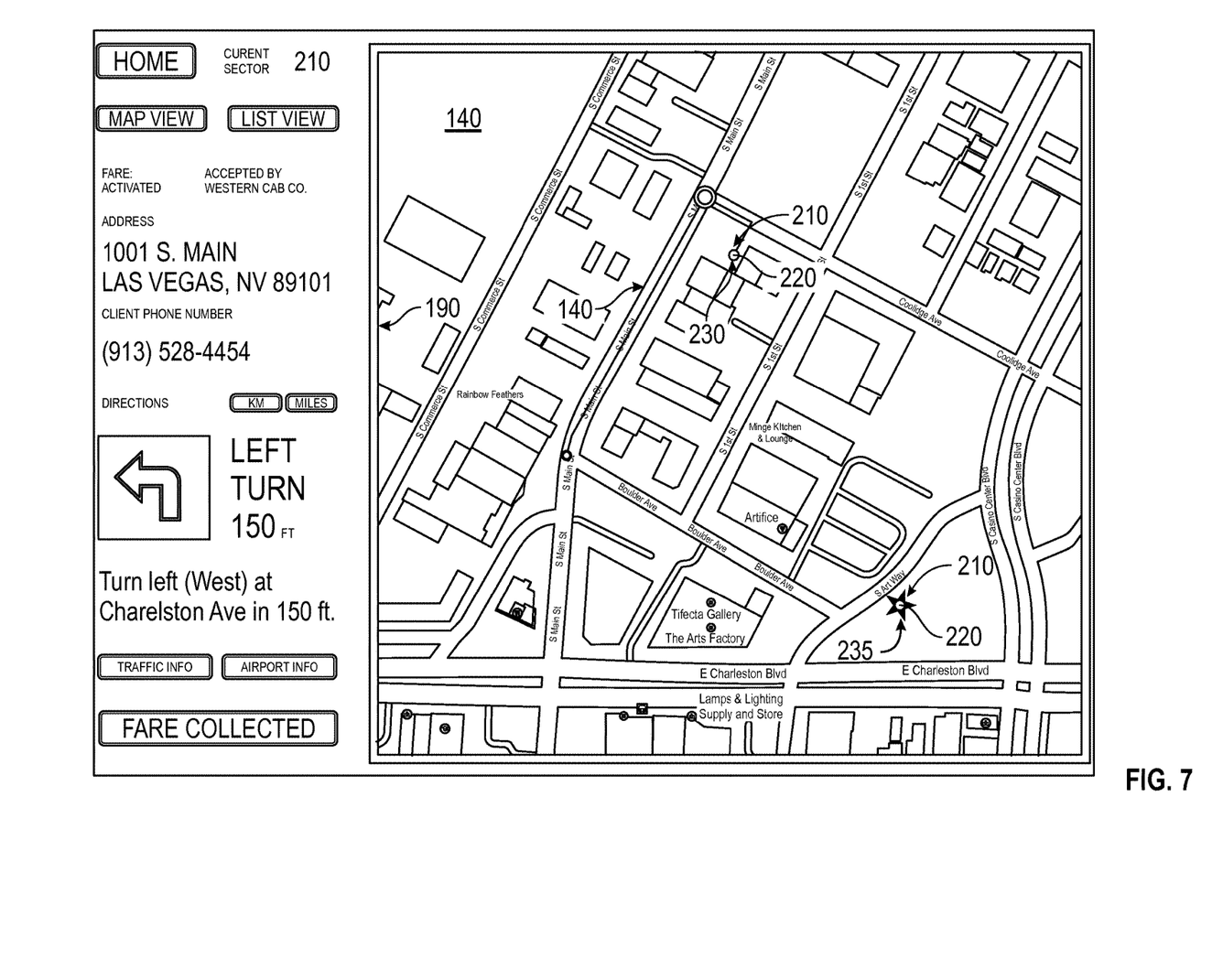
FIG. 7 is a display screen of the display device showing routing information between a current location of a taxi and a desired destination.

In a preferred embodiment, each display device 40 further includes a GPS navigation system 170 (FIG. 3) that is adapted to determine a current location of the taxi 20 and display the current location on the map 140. The GPS navigation system 170 may further be adapted to superimpose traffic information 180 received by the display device 40 onto the map 140, and to provide routing information 190 (FIG. 7) between the current location of the taxi and an entered or indicated destination.

In one embodiment, the dispatch information system 70 further includes a call center input 200 wherein a ride request 210 received by a call center may be transmitted to the display devices 40 of each taxi 20. The display device 40 in each taxi 20 further is adapted to display the location 220 of the ride request 210 on the map 140 and to further display a status 230 of the ride request 210, such as "available," "accepted," "expired," or the like. In one embodiment, if a first call center provides a ride request 210 then the dispatch information system 70 preferably sends the ride request 210 information only to taxis 20 associated with the first call center. If, after a predetermined period of time, such as one minute, the ride request remains having a status of "available" then the dispatch information system 70 may send the ride request 210 information to other taxis 20 associated with other call centers or companies.

In one embodiment, the status 230 of the ride request 210 includes a desirability indicator 235 that includes as one of its inputs an estimated distance required for the ride request 210 with longer distances indicating higher desirability. The display device 40 in each taxi 20 further adapted to display the desirability indicator 230 associated with each ride request 210, such as by using a different color or symbol for the ride request 210 if the desirability of the ride request 210 is relatively high, for example. Optionally the display device 40 in each taxi 20 only indicates the desirability indicator 235 for a ride request 210 having a relatively high desirability and only after a predetermined time, such as five or ten minutes after the ride request 210 is received, such that less desirable ride requests 210 are still properly served.

In such an embodiment, each display device 40 may further include a user interface 42 that allows the driver 25 to accept the ride request 210, after which the transceiver 60 of the display device 40 informs the dispatch information system 70 of the acceptance of the ride request 40 by the taxi 20 and transmits the status of the ride request 210 as being "accepted" to the display devices 40 of the other taxis 20 within the region. In one embodiment wherein the display devices 40 each include the GPS navigation system 170, only those ride requests 210 within a predetermined distance D (FIG. 5), such as one mile for example, of the current location of the taxi 20 are displayed on display device 40, and the driver 20 is prevented from accepting ride requests 210 outside of the predetermined distance D of his current location.

Figure 6:
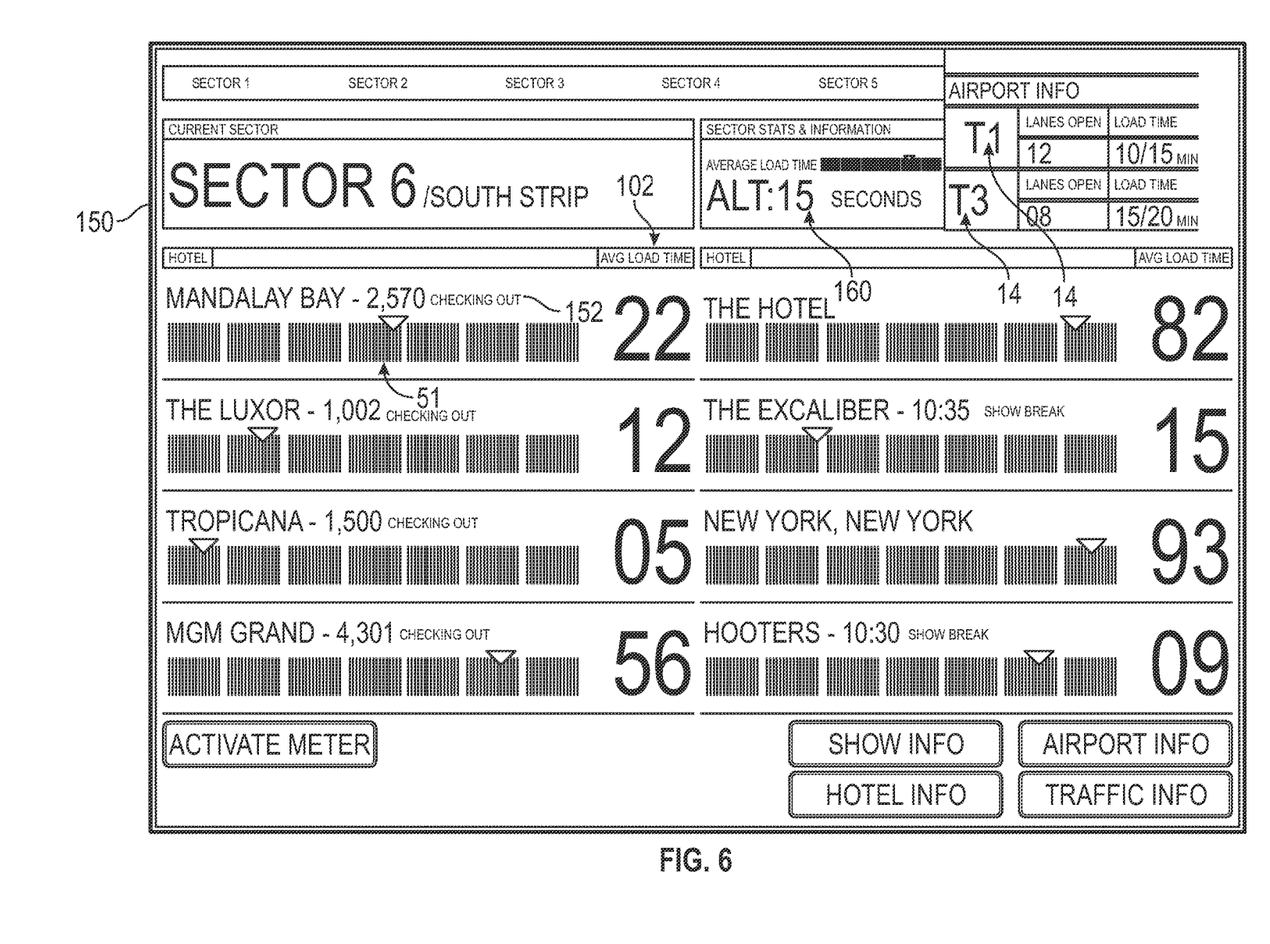
FIG. 6 is a display screen of the display device showing a bar graph representing taxi queue lengths at a plurality of popular destinations within a grid of the operating area.

Preferably one of the selectable information screens 50 includes a bar graph 51 (FIG. 6) showing the length 101 of the taxi queue 16 at each of the popular destinations 15, and also preferably the average load times 102 for each of the popular destinations 15. Further, taxi queue affecting event information 52 may also be displayed on such an information screen 50, as entered by the taxi stand doorman 17, for example. Such taxi queue affecting event information 52 may be, for example, a number of people checking out of a hotel popular destination 15 on that particular day, a number of people at a particular show that is ending soon, or the number of flights expected to be landing at an airport 13 on that particular day, or within the next predetermined number of hours or minutes. Such taxi queue affecting event information 52 may also include events expected to increase demand for taxis, such as when performances or shows attended by a large number of people end, for example.

Preferably the popular destinations 15 include airport pickup locations 14 within the airport 13. Airports 13 are such important travel destinations that airport information 30 may be displayed on multiple of the information screens 50, such airport information 30 including any of average taxi loading times 102, open taxi queue lanes 12, taxi queue length 101, number of flights landing within a next predetermined period of time, expected number of passengers landing within a next predetermined period of time, or the like.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for displaying information to drivers of taxis in an operating region that includes a plurality of destinations, comprising:
   a display device fixed within each taxi, the display device having a plurality of selectable information screens each adapted to display information received by a transceiver of the display device;
   a dispatch information system adapted to transmit dispatching data of the operating region to the display devices of each taxi;
   a queue information device associated with each of the plurality of destinations and adapted to transmit the queue information to the dispatch information system, the queue information including at least a length of a taxi queue of each of the plurality of destinations;
   wherein the dispatching data transmitted to each display device includes at least the length of the taxi queue at each of the plurality of destinations and an average load time for each taxi as calculated by an average time it takes for a taxi entering the taxi queue to get a load, and
   wherein at least one of the selectable information screens of each display device includes a map of the operating region, the display showing the operating region separated into different grids each having an aggregate indicator that indicates an average of the average load time of the taxi queues of the plurality of destinations within the grid.

2. The system of claim 1 wherein the length of the taxi queue at each of the plurality of destinations is periodically entered manually on an interface of the queue information device by a taxi stand doorman at each of the plurality of destinations.

3. The system of claim 1 wherein the length of the taxi queue at each of the plurality of destinations is detected periodically with at least one sensor at the taxi queue.

4. The system of claim 3 wherein the at least one sensor is a camera.

5. The system of claim 1 wherein the aggregate indicator is color coded, whereby the taxi drivers may quickly ascertain which grid areas of the operating region have a lowest average load times by finding on the map of the operating region the grid areas having the aggregate indicator that is the color associated with low average load times.

6. The system of claim 1 wherein the aggregate indicator is numerically coded, whereby the taxi drivers may quickly ascertain which grid areas of the operating region have a lowest average load times by finding on the map of the operating region the grid areas having the aggregate indicator with the number associated with low average load times.

7. The system of claim 1 wherein the display device further includes a GPS navigation system adapted to receive traffic information, whereby the map further includes traffic information superimposed thereon.

8. The system of claim 1 wherein the display device further includes a GPS navigation system, whereby one of the selectable information screens shows routing information between a current location of the taxi and an entered destination.

9. The system of claim 1 wherein the dispatch information system further includes a call center input wherein a ride request by a client within the operating region may be transmitted to the display devices of each taxi, the display device in each taxi further adapted to display the location of the ride request on the map information screen and a status of the ride request.

10. The system of claim 9 wherein the display device in each taxi further includes a user interface that allows the driver to accept the ride request, wherein the transceiver of the display device of the taxi informs the dispatch information system of the acceptance of the ride request by the taxi and transmits the status of the ride request as being accepted to the display devices of the other taxis within the region.

11. The system of claim 9 wherein the display device further includes a GPS navigation system adapted to show the current location of the taxi, and to only show those ride requests within a predetermined distance of the current location of the taxi.

12. The system of claim 11 wherein the display device in each taxi further includes a user interface that allows the driver to accept the ride request only within the predetermined distance of the current location of the taxi, wherein the transceiver of the display device of the taxi informs the dispatch information system of the current location of the taxi and the acceptance of the ride request by the taxi driver, and wherein the dispatch information system transmits the status of the ride request as being accepted to the display devices of the other taxi drivers within the predetermined distance of the ride request.

13. The system of claim 1 wherein at least one of the selectable information screens includes for each of the plurality of destinations a bar graph showing the length of the taxi queue at each of the plurality of destinations.

14. The system of claim 1 wherein at least one of the selectable information screens is a bar graph showing the length of the taxi queue at each of the plurality of destinations within one of the selected grids.

15. The system of claim 1 wherein the dispatching data transmitted to each display device includes relevant taxi queue affecting event information as entered by a taxi stand doorman at each of the plurality of destinations.

16. The system of claim 1 wherein at least one of the plurality of destinations is an airport pickup location within an airport of the operating region, and wherein more than one of the plurality of selectable information screens includes the information relating to the at least one airport pickup location.

17. The system of claim 16 wherein the information relating to the at least one airport pickup location includes any of average taxi loading times, open taxi queue lanes, taxi queue length, number of flights landing within a next predetermined period of time, and expected number of passengers landing within a next predetermined period of time.

18. The system of claim 9 wherein the status of the ride request includes a desirability indicator that includes as one of its inputs an estimated distance required for the ride request with longer distances indicating higher desirability, the display device in each taxi further adapted to display the desirability indicator associated with each ride request.

19. The system of claim 18 wherein the display device in each taxi only indicates the desirability indicator for a ride request having a relatively high desirability and only after a predetermined time.

\* \* \* \* \*